(12) United States Patent
Sugano et al.

(10) Patent No.: US 10,415,673 B2
(45) Date of Patent: Sep. 17, 2019

(54) VEHICLE POWER UNIT

(71) Applicant: HONDA MOTOR CO., LTD., Tokyo (JP)

(72) Inventors: Takeshi Sugano, Wako (JP); Tensei Hayashi, Wako (JP); Toshimasa Mitsubori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 640 days.

(21) Appl. No.: 14/917,091

(22) PCT Filed: May 29, 2014

(86) PCT No.: PCT/JP2014/064235
§ 371 (c)(1),
(2) Date: Mar. 7, 2016

(87) PCT Pub. No.: WO2015/037284
PCT Pub. Date: Mar. 19, 2015

(65) Prior Publication Data
US 2016/0195170 A1 Jul. 7, 2016

(30) Foreign Application Priority Data
Sep. 11, 2013 (JP) ................................. 2013-188454

(51) Int. Cl.
*F16H 3/091* (2006.01)
*B60K 17/06* (2006.01)
(Continued)

(52) U.S. Cl.
CPC ............ *F16H 3/091* (2013.01); *B60K 17/06* (2013.01); *B60K 17/08* (2013.01); *B62M 11/04* (2013.01);
(Continued)

(58) Field of Classification Search
CPC .......... F16H 3/006; F16H 3/091; F16H 57/02; F16H 57/025; F16H 59/38; F16H 59/42; F16H 63/18; B60K 17/06; B60K 17/08
(Continued)

(56) References Cited

U.S. PATENT DOCUMENTS 7,510,503 B2 * 3/2009 Takeuchi ................ F16D 48/06
477/87
7,980,122 B2 * 7/2011 Fujimoto ................ F02B 61/02
73/115.02
(Continued)

FOREIGN PATENT DOCUMENTS

| CN | 101353078 A | 1/2009 |
| CN | 101469639 A | 7/2009 |

(Continued)

OTHER PUBLICATIONS

Office Action dated Sep. 27, 2016, issued in counterpart Chinese Patent Application No. 201480049921.5, with English translation. (9 pages).
(Continued)

*Primary Examiner* — William C Joyce
(74) *Attorney, Agent, or Firm* — Westerman, Hattori, Daniels & Adrian, LLP

(57) ABSTRACT

A vehicle power unit is provided in which a transmission including a gear transmission mechanism and a gear selector mechanism is housed in a transmission case, the gear transmission mechanism having gear trains with a plurality of gear positions that can be established alternatively, the gear selector mechanism being capable of operating s as to alternatively establish the gear trains with the plurality of gear positions, and a plurality of rotational speed sensors individually detecting the rotational speed of a plurality of rotating members forming part of the transmission are mounted on the transmission case, wherein the plurality of
(Continued)

rotational speed sensors are disposed in a distributed manner so as to sandwich the plurality of shaft members of the gear selector mechanism in a projection on a plane orthogonal to a central axis of a crankshaft.

8 Claims, 6 Drawing Sheets

(51) Int. Cl.
| | |
|---|---|
| *F16H 59/42* | (2006.01) |
| *F16H 61/00* | (2006.01) |
| *F16H 63/18* | (2006.01) |
| *B60K 17/08* | (2006.01) |
| *B62M 11/04* | (2006.01) |
| *F16H 57/02* | (2012.01) |
| *F16H 57/025* | (2012.01) |
| *F16H 63/08* | (2006.01) |
| *F16H 61/688* | (2006.01) |
| *F16H 3/00* | (2006.01) |
| *F16H 59/38* | (2006.01) |

(52) U.S. Cl.
CPC ............. *F16H 3/006* (2013.01); *F16H 57/02* (2013.01); *F16H 57/025* (2013.01); *F16H 59/38* (2013.01); *F16H 59/42* (2013.01); *F16H 61/00* (2013.01); *F16H 61/688* (2013.01); *F16H 63/08* (2013.01); *F16H 63/18* (2013.01); *B60Y 2200/12* (2013.01)

(58) Field of Classification Search
USPC .............................. 73/115.02; 74/330, 337.5
See application file for complete search history.

(56) References Cited

U.S. PATENT DOCUMENTS

| | | | | |
|---|---|---|---|---|
| 8,245,683 | B2 * | 8/2012 | Taki | ..................... F02F 7/0058 |
| | | | | 123/195 A |
| 8,397,596 | B2 * | 3/2013 | Tomoda | .................. F16H 63/18 |
| | | | | 74/337.5 |
| 2009/0165545 | A1 | 7/2009 | Fujimoto et al. | |
| 2009/0247358 | A1 | 10/2009 | Kojima et al. | |

FOREIGN PATENT DOCUMENTS

| | | | |
|---|---|---|---|
| CN | 101517280 A | | 8/2009 |
| CN | 102791994 A | | 11/2012 |
| EP | 2 039 911 | * | 3/2009 |
| EP | 2 372 196 A1 | | 10/2011 |
| JP | 2007-197003 | * | 8/2007 |
| JP | 2009-24857 A | | 2/2009 |
| JP | 2009-174699 A | | 8/2009 |
| JP | 2009-236194 A | | 10/2009 |
| JP | 2010-59828 | * | 3/2010 |
| JP | 2010-127265 | * | 6/2010 |
| JP | 2013-36571 A | | 2/2013 |
| JP | 2014-69665 | * | 4/2014 |

OTHER PUBLICATIONS

International Search Report dated Jul. 29, 2014, issued in counterpart International Application No. PCT/JP2014/064235 (1 page).

* cited by examiner

VEHICLE POWER UNIT

TECHNICAL FIELD

The present invention relates to a vehicle power unit in which a transmission is housed in a transmission case mounted on a vehicle body frame, the transmission including a gear transmission mechanism that includes gear trains with a plurality of gear positions that can be established alternatively provided between a main shaft into which power from a crankshaft of an internal combustion engine can be input and a countershaft disposed in parallel to the main shaft at a position offset in a vertical direction with respect to the main shaft and operatively linked to a driven wheel, and a gear selector mechanism that is arranged so as to have a plurality of shaft members disposed in parallel to the main shaft and the countershaft on a side opposite to the crankshaft with respect to a virtual plane that passes through a central axis of the main shaft and a central axis of the countershaft and that is capable of operating so as to alternatively establish the gear trains of the plurality of gear positions, and a plurality of rotational speed sensors are mounted on the transmission case on the side opposite to the crankshaft with respect to the virtual plane, the plurality of rotational speed sensors individually detecting a rotational speed of a plurality of rotating members forming part of the gear transmission mechanism.

BACKGROUND ART

A two-wheeled motor vehicle power unit that carries out automatic speed change based on the vehicle speed obtained from a rotational speed sensor detecting the rotational speed of a gear forming part of a gear transmission is known from Patent Document 1.

RELATED ART DOCUMENTS

Patent Documents

Patent Document 1: Japanese Patent Application Laid-open No. 2009-024857

SUMMARY OF THE INVENTION

Problems to be Solved by the Invention

The arrangement disclosed in Patent Document 1 above carries out automatic speed change control based on a measurement value from one rotational speed sensor, but in order to improve the precision of automatic speed change control the use of a plurality of rotational speed sensors could be considered. However, when a plurality of rotational speed sensors are disposed in a power unit, since it is necessary to ensure that there is space for disposing these rotational speed sensors, there is a possibility that the power unit will increase in size, and it becomes necessary to take into consideration interference with the surrounding area.

The present invention has been accomplished in light of such circumstances, and it is an object thereof to provide a vehicle power unit that enables a plurality of rotational speed sensors to be disposed while avoiding any increase in size.

Means for Solving the Problems

In order to attain the above object, according to a first aspect of the present invention, there is provided a vehicle power unit in which a transmission comprising a gear transmission mechanism and a gear selector mechanism is housed in a transmission case mounted on a vehicle body frame, the gear transmission mechanism comprising gear trains with a plurality of gear positions that can be established alternatively provided between a main shaft into which power from a crankshaft of an internal combustion engine can be input and a countershaft disposed in parallel to the main shaft at a position offset in a vertical direction with respect to the main shaft and operatively linked to a driven wheel, the gear selector mechanism being arranged so as to have a plurality of shaft members disposed in parallel to the main shaft and the countershaft and being disposed on a side opposite to the crankshaft with respect to a virtual plane passing through a central axis of the main shaft and a central axis of the countershaft while being capable of operating so as to alternatively establish the gear trains with the plurality of gear positions, and a plurality of rotational speed sensors individually detecting a rotational speed of a plurality of rotating members forming part of the gear transmission mechanism are mounted on the transmission case on the side opposite to the crankshaft with respect to the virtual plane, characterized in that the plurality of rotational speed sensors are disposed in a distributed manner so as to sandwich the plurality of shaft members of the gear selector mechanism in a projection on a plane orthogonal to a central axis of the crankshaft.

Further, according to a second aspect of the present invention, in addition to the first aspect, the central axis of the main shaft is disposed further upward and forward in a vehicle fore-and-aft direction than the central axis of the countershaft so as to extend in a vehicle width direction, at least one of the plurality of rotational speed sensors is mounted on an upper face of the transmission case, and at least one of the remaining rotational speed sensors is mounted on a rear face, along the vehicle fore-and-aft direction, of the transmission case (19).

According to a third aspect of the present invention, in addition to the first or second aspect, at least one of the plurality of rotational speed sensors is mounted on the transmission case so as to oppose an outer periphery of a drive gear provided on the main shaft, and at least one of the remaining rotational speed sensors is mounted on the transmission case so as to oppose an outer periphery of a driven gear provided on the countershaft.

According to a fourth aspect of the present invention, in addition to any one of the first to third aspects, the transmission case is divided into two and formed from an upper case half body and a lower case half body one above the other, the plurality of rotational speed sensors and the plurality of shaft members of the gear selector mechanism being supported on the upper case half body.

According to a fifth aspect of the present invention, in addition to the second aspect, a projection is projectingly provided on a rear end part of the transmission case so as to face rearward along the vehicle fore-and-aft direction, the projection forming a through hole, a support member for supporting the transmission case on the vehicle body frame being inserted through the through hole, and a rotational speed sensor mounted on the rear face of the transmission case is covered from below by the projection.

According to a sixth aspect of the present invention, in addition to any one of the first to fifth aspects, the plurality of rotational speed sensors are disposed so that, among the rotational speed sensors, a central axis of some of the rotational speed sensors and a central axis of the other rotational speed sensor intersect at an acute angle in a projection on a plane orthogonal to the central axis of the crankshaft, the other rotational speed sensor sandwiching a plurality of shaft members of the gear selector mechanism between the other rotational speed sensor and the some of the rotational speed sensors.

According to a seventh aspect of the present invention, in addition to the sixth aspect, the gear selector mechanism comprises a shift drum, a shift fork shaft, and a shift spindle, which correspond to the shaft member, and the shift drum, the shift fork shaft, and the shift spindle are disposed in a range surrounded by the central axis of the some of the rotational speed sensors and the central axis of the other rotational speed sensor in a projection on a plane orthogonal to the central axis of the crankshaft.

According to an eighth aspect of the present invention, in addition to any one of the first to seventh aspects, the central axis of the crankshaft is disposed so as to extend in the vehicle width direction, and an automatic gear change control device that includes a shift actuator is disposed on a face, on one side in the vehicle width direction, of the transmission case to a rear of the virtual plane in the vehicle fore-and-aft direction as seen in a side view of the transmission case, so as to drive the gear selector mechanism.

Moreover, according to a ninth aspect of the present invention, in addition to any one of the first to eighth aspects, the main shaft comprises a first shaft having a first clutch disposed between the first shaft and the crankshaft, and a second shaft coaxially and relatively rotatably surrounding the first shaft so as to have a second clutch disposed between the second shaft and the crankshaft, among the first to third rotational speed sensors the first rotational speed sensor is disposed so as to oppose an outer periphery of a drive gear, which is the rotating member supported on the first shaft so as to rotate at a rotational speed corresponding to a vehicle speed, the second rotational speed sensor is disposed so as to oppose an outer periphery of another drive gear, which is the rotating member provided on the second shaft so as to rotate together with the second shaft, and the third rotational speed sensor is disposed so as to oppose an outer periphery of a driven gear, which is the rotating member relatively rotatably supported on the countershaft so as to rotate synchronously with the first shaft.

A crankcase 19 of an embodiment corresponds to the transmission case of the present invention, an electric motor 106 of the embodiment corresponds to the shift actuator of the present invention, a fifth speed drive gear 118, a fourth speed drive gear 120, and a first speed driven gear 121 of the embodiment correspond to the rotating member of the present invention, and a rear wheel WR of the embodiment corresponds to the driven wheel of the present invention.

Effects of the Invention

In accordance with the first aspect of the present invention, since the plurality of rotational speed sensors mounted on the transmission case on the side opposite to the crankshaft with respect to the virtual plane passing through the central axes of the main shaft and the countershaft are disposed in a divided manner so as to sandwich the plurality of shaft members of the gear selector mechanism in a projection on a plane orthogonal to the central axis of the crankshaft, it is possible to dispose the gear selector mechanism and the plurality of rotational speed sensors in a concentrated manner while easily avoiding interference between the plurality of rotational speed sensors, thus avoiding any increase in the size of the power unit and enhancing the degree of freedom of the layout of the transmission within the transmission case.

Furthermore, in accordance with the second aspect of the present invention, since the central axis of the main shaft extending in the vehicle width direction is present in front of and above the central axis of the countershaft, at least one rotational speed sensor is mounted on the upper face of the transmission case, and at least one of the other rotational speed sensors is mounted on the rear face of the transmission case, it is possible to dispose the gear selector mechanism and at least some of the rotational speed sensors in a concentrated manner on the rear side upper part of the transmission case, thus enabling the power unit to be made compact.

In accordance with the third aspect of the present invention, since at least one rotational speed sensor opposes the outer periphery of the drive gear, and at least one of the other rotational speed sensors is disposed so as to oppose the outer periphery of the driven gear, it becomes easy to avoid interference between the rotational speed sensors by disposing at least two rotational speed sensors so as to be spaced from each other, and it is possible to ensure that there is space for disposing components of the transmission between the rotational speed sensors, thus enabling the power unit to be made smaller.

In accordance with the fourth aspect of the present invention, since the plurality of rotational speed sensors, the shift drum, the shift fork shaft, and the shift spindle are supported on the upper case half body, which forms the transmission case together with the lower case half body, it is possible to make the power unit more compact by disposing the rotational speed sensors and the gear selector mechanism in a concentrated manner on the upper case half body.

In accordance with the fifth aspect of the present invention, since the rotational speed sensor mounted on the rear face of the transmission case is covered from below by the projection provided on the rear end part of the transmission case and projecting rearward along the vehicle fore-and-aft direction, it is possible to protect the rotational speed sensor from flying stones, grit, etc. scattered by the wheel.

In accordance with the sixth aspect of the present invention, since the central axis of some of the rotational speed sensors and the central axis of the other rotational speed sensor sandwiching the plurality of shaft members of the gear selector mechanism between itself and the some of the rotational speed sensors intersect each other at an acute angle in a projection on a plane orthogonal to the central axis of the crankshaft, it is possible to dispose the shaft member of the gear selector mechanism and the rotation sensor together in a compact manner, thus contributing to making the power unit compact and concentrating the mass.

In accordance with the seventh aspect of the present invention, since the shift drum, the shift fork shaft, and the shift spindle of the gear selector mechanism are disposed in a range that is surrounded by the central axis of some of the rotational speed sensors and the central axis of the other rotational speed sensor sandwiching the plurality of shaft members of the gear selector mechanism between itself and the some of the rotational speed sensors, it is possible to dispose the shift drum, the shift fork shaft, and the shift spindle together in a more compact manner, thus further contributing to making the power unit compact and concentrating the mass.

In accordance with the eighth aspect of the present invention, since the automatic gear change control device for driving the gear selector mechanism is disposed on one side face in the vehicle width direction of the transmission case to the rear, in the vehicle fore-and-aft direction, of the virtual plane passing through the central axes of the main shaft and the countershaft, it is possible to also dispose the automatic gear change control device in a concentrated manner in the rear part of the transmission case when the power unit is viewed from the side, thus making the power unit compact.

Furthermore, in accordance with the ninth aspect of the present invention, since the main shaft includes the first and second shafts coaxially and relatively rotatably disposed so as to each have the clutch disposed between itself and the crankshaft, the first rotational speed sensor is disposed so as to oppose the outer periphery of the drive gear supported on the first shaft so as to rotate at a rotational speed corresponding to the vehicle speed, the second rotational speed sensor is disposed so as to oppose the outer periphery of the other drive gear provided on the second shaft so as to rotate together with the second shaft, and the third rotational speed sensor is disposed so as to oppose the outer periphery of the driven gear relatively rotatably supported on the countershaft so as to rotate synchronously with the first shaft, with regard to the power unit in which the first to third rotational speed sensors are individually opposed to the gears, which have different rotational speeds depending on the running conditions, it is possible, by disposing the three rotational speed sensors together on the side opposite to the crankshaft with respect to the virtual plane passing through the central axes of the main shaft and the countershaft, to make the power unit compact even when there are three rotational speed sensors.

EXPLANATION OF REFERENCE NUMERALS AND SYMBOLS

Figure 1:
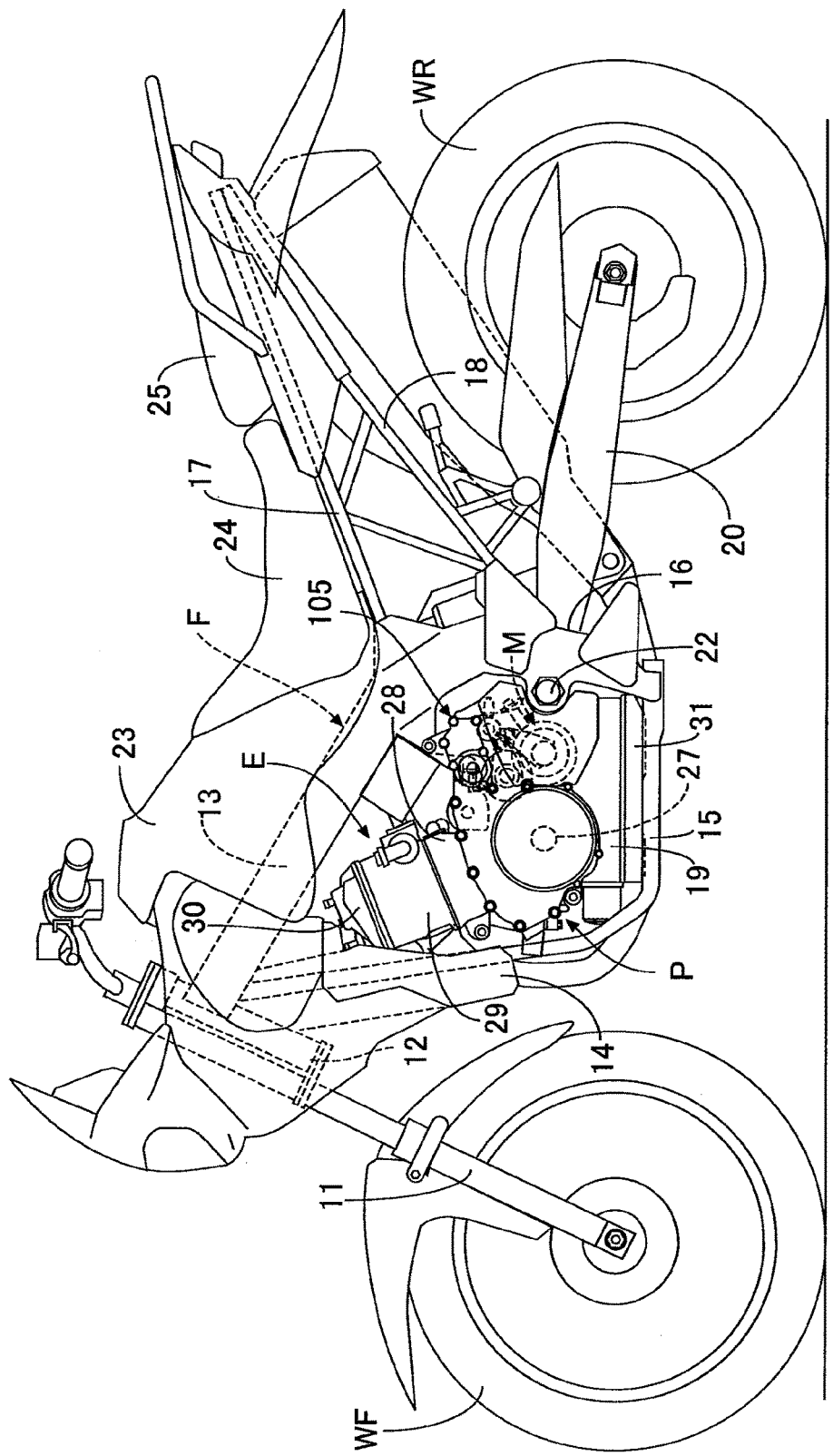
FIG. 1 is a side view of a two-wheeled motor vehicle. (first embodiment)

19 Crankcase, which is a transmission case
22 Support shaft, which is a support member
27 Crankshaft
32 Upper case half body
32a Upper face of crankcase, which is a transmission case
32b Rear face of crankcase, which is a transmission case
33 Lower case half body
50 Gear transmission mechanism
51 Gear selector mechanism
52 Main shaft
53 Countershaft
54 First shaft
55 Second shaft
68 First clutch
69 Second clutch
81 Shift drum, which is a shaft member
82, 83 Shift fork shaft, which is a shaft member
84 Shift spindle, which is a shaft member
105 Automatic gear change control device
106 Electric motor, which is a shift actuator
118 Fifth speed drive gear, which is a rotating member
120 Fourth speed drive gear, which is a rotating member
121 First speed driven gear, which is a rotating member
126 Through hole
127 Projection
C2 Central axis of main shaft
C3 Central axis of countershaft
C4 Central axis of shift drum
C5, C6 Central axis of shift fork shaft
C7 Central axis of shift spindle
C8, C9 Central axis of some rotational speed sensors
C10 Central axis of other rotational speed sensor
E Internal combustion engine
F Vehicle body frame
G1, G2, G3, G4, G5, G6 Gear train
M Transmission
P Power unit
PL Virtual plane
S1, S2, S3 Rotational speed sensor
WR Rear wheel, which is a driven wheel

MODE FOR CARRYING OUT THE INVENTION

An embodiment of the present invention is explained below by reference to the attached FIG. 1 to FIG. 6.

First Embodiment

First, in FIG. 1, a vehicle body frame F of a two-wheeled motor vehicle, which is a saddled vehicle, includes a head pipe 12 steerably supporting a front fork 11 axially supporting a front wheel WF, a pair of left and right main frames 13 extending from the head pipe 12 downward to the rear, a pair of left and right down frames 14 extending downward to the rear at a steeper angle than the main frames 13, a lower frame 15 extending from lower ends of the two down frames 14 to the rear, a pair of left and right center frames 16 extending from rear ends of the main frames 13 downward and provided so as to be connected to rear ends of the two lower frames 15, a pair of left and right seat rails 17 extending from the rear ends of the main frame 13 upward to the rear, and a pair of left and right rear subframes 18 joining a lower part of the center frame 16 and a rear part of the seat rail 17.

Disposed in a region surrounded by the main frame 13, the down frame 14, the lower frame 15, and the center frame 16 so as to be supported by the vehicle body frame F is a power unit P that includes a twin cylinder internal combustion engine E and a transmission M (see FIG. 4), the transmission M being housed in a crankcase 19, which is a transmission case of the internal combustion engine E. A front end part of a swing arm 20 having a rear end part axially supporting a rear wheel WR driven with power exerted by the power unit P is vertically swingably supported on the lower part of the center frame 16 via a support shaft 22, and a rear part of the crankcase 19 is also supported by the support shaft 22. A fuel tank 23 is mounted on the main frame 13 above the internal combustion engine E, and a rider's seat 24 disposed to the rear of the fuel tank 23 and a pillion seat 25 disposed to the rear of the rider seat 24 are supported by the seat rails 17.

Figure 2:
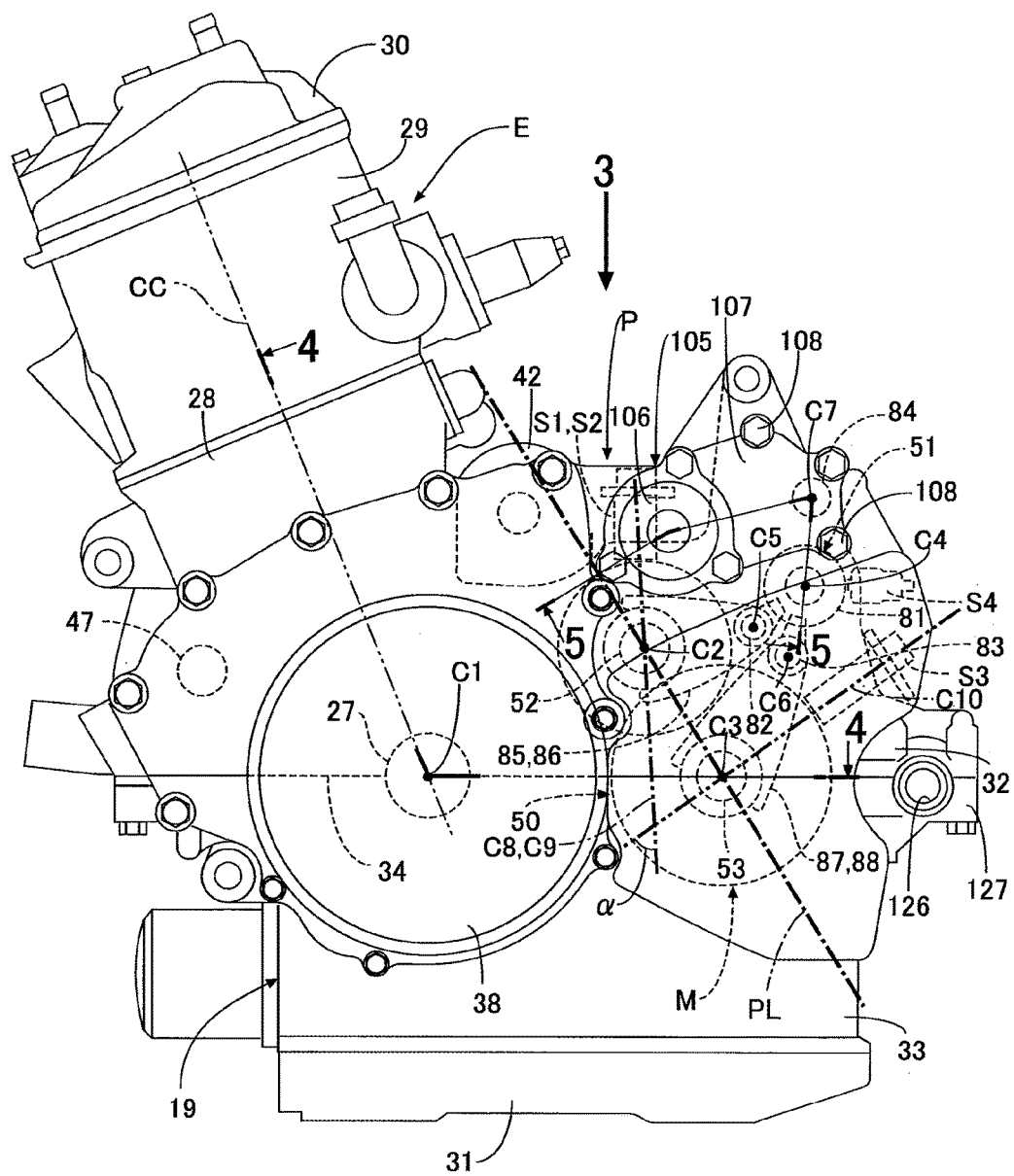
FIG. 2 is a side view when a power unit is viewed in the same direction as in FIG. 1. (first embodiment)
Figure 3:
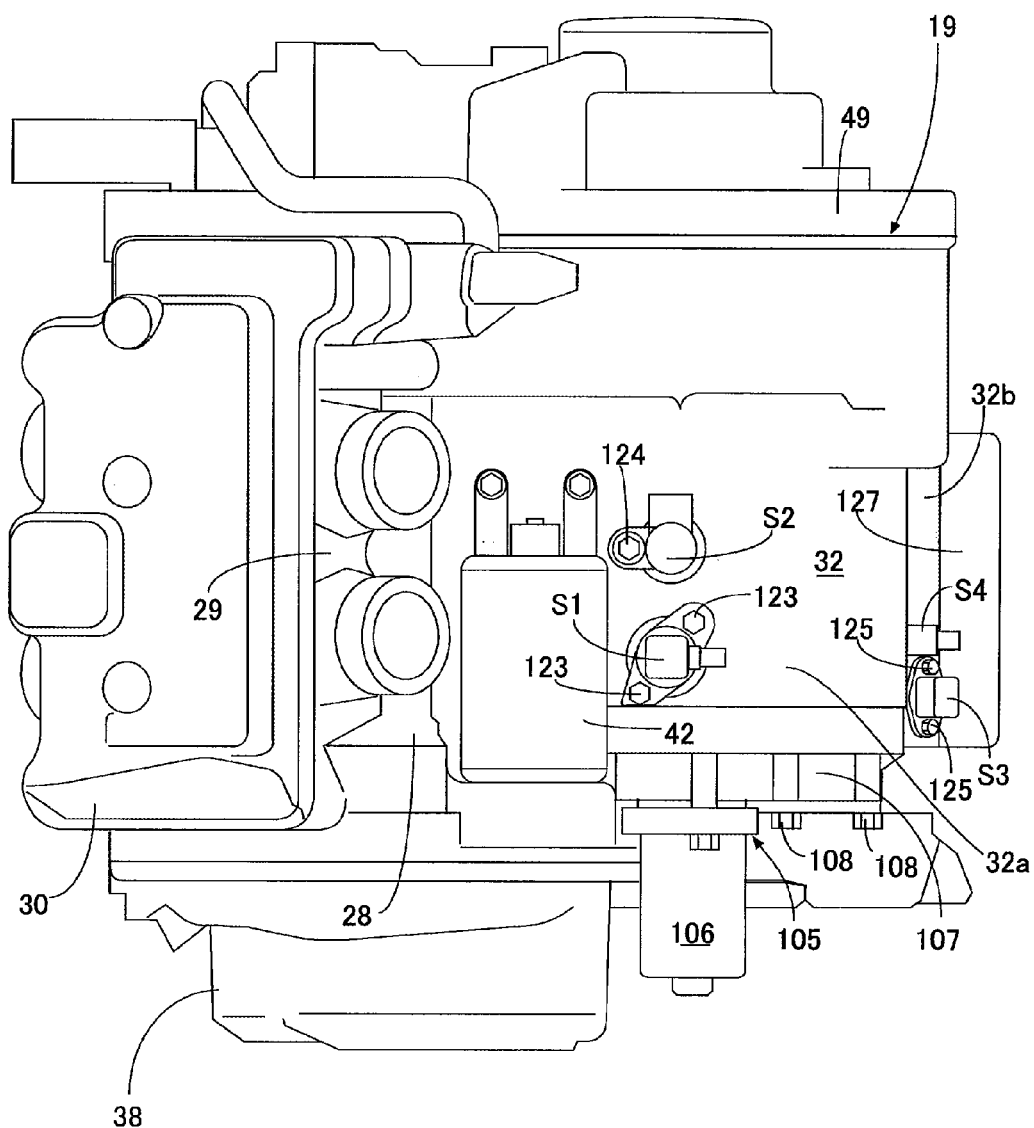
FIG. 3 is a view in the direction of arrow 3 in FIG. 2. (first embodiment)

Referring in addition to FIG. 2 and FIG. 3, the internal combustion engine E includes the crankcase 19 rotatably supporting a crankshaft 27 having an axis extending in the vehicle width direction, a cylinder block 28 having a forwardly inclined cylinder axis CC and being joined to the front upper end of the crankcase 19, a cylinder head 29 joined to the upper end of the cylinder block 28, and a head cover 30 joined to the upper end of the cylinder head 29, and an oil pan 31 is joined to a lower part of the crankcase 19.

The crankcase 19 is formed by joining an upper case half body 32 and a lower case half body 33 that are dividable one above the other via a dividing face 34, the cylinder block 28 being formed integrally with the upper case half body 32.

Figure 4:
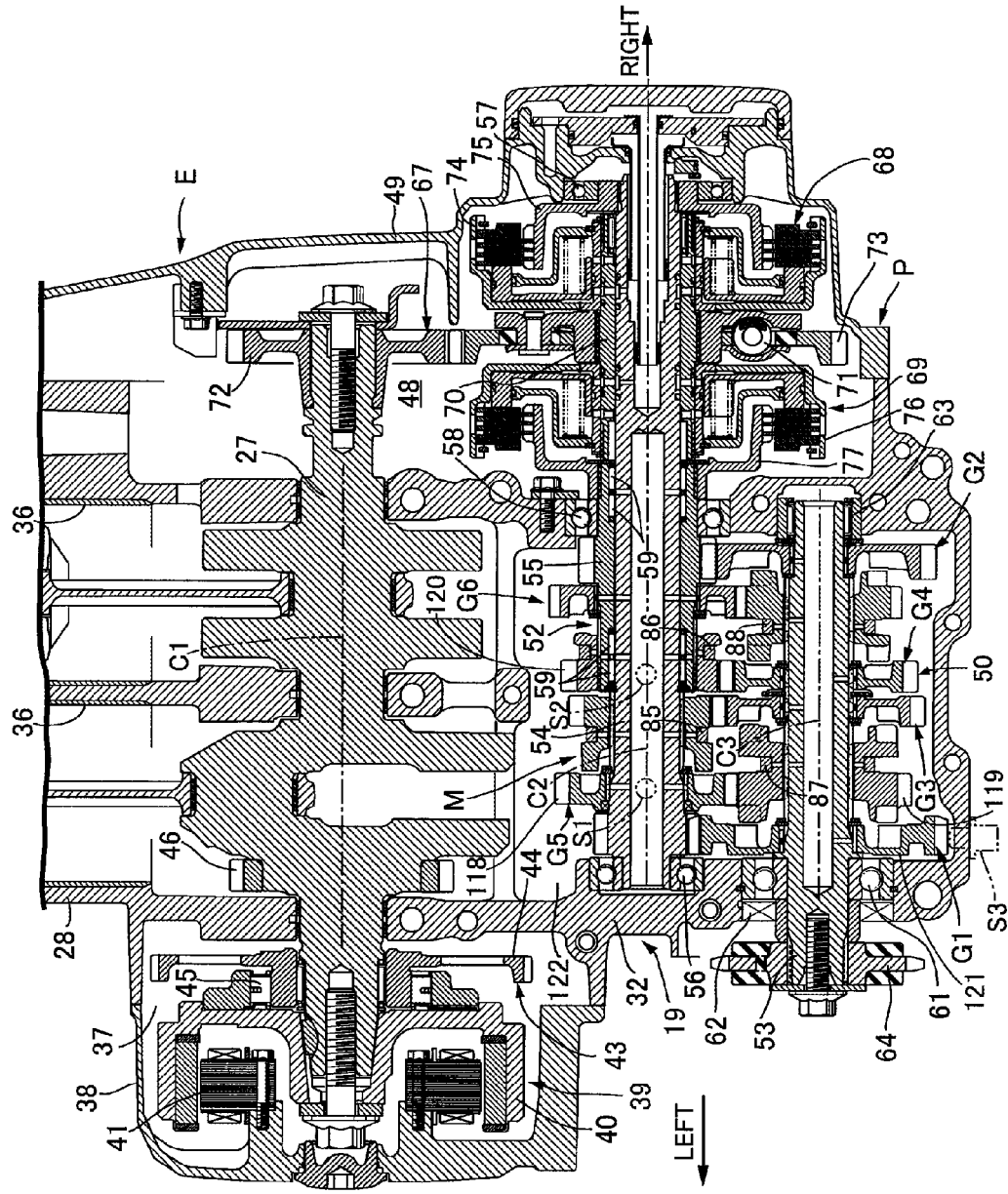
FIG. 4 is a sectional view along line 4-4 in FIG. 2. (first embodiment)

In FIG. 4, the cylinder block 28 has two cylinder bores 36 and 36 disposed side by side in the vehicle width direction, and the crankshaft 27, which has a central axis C1 extending along the direction in which the cylinder bores 36 and 36 are arranged, that is, the vehicle width direction, is rotatably supported on the crankcase 19 so that the central axis C1 is disposed on the dividing face 34.

Joined to a left side face of the crankcase 19 is a left case cover 38 forming a generator chamber 37 between itself and the crankcase 19, a rotor 40 of a generator 39 housed in the generator chamber 37 being fixed to an end part of the crankshaft 27 projecting into the generator chamber 37, and a stator 41 of the generator 39 being fixed to the left case cover 38 so as to be surrounded by the rotor 40.

A starter motor 42 is fixedly disposed on an upper face of the crankcase 19, that is, an upper face 32a of the upper case half body 32 as is clearly shown in FIG. 3, and this starter motor 42 is covered from the side by an upper end part of the left case cover 38. A driven gear 44 forming part of a reduction gear train 43 for transmitting power from the starter motor 42 is linked to the rotor 40 via a one way clutch 45.

A drive gear 46 is fixed to the crankshaft 27 at a position approaching the left side wall of the crankcase 19 from the interior. A balancer shaft 47 disposed above and in front, in the vehicle fore-and-aft direction, of the crankshaft 27 is rotatably supported on the upper case half body 32 of the crankcase 19 as shown in FIG. 2, the rotational power from the drive gear 46 being transmitted to the balancer shaft 47. Joined to a right side face of the crankcase 19 is a right case cover 49 forming a clutch chamber 48 between itself and the crankcase 19.

The transmission M housed within the crankcase 19 includes a gear transmission mechanism 50 having gear trains with a plurality of gear positions that can be alternatively established, for example, a first speed gear train G1, a second speed gear train G2, a third speed gear train G3, a fourth speed gear train G4, a fifth speed gear train G5, and a sixth speed gear train G6, and a gear selector mechanism 51 that can operate so as to alternatively establish the first to sixth speed gear trains G1 to G6.

The gear transmission mechanism 50 is formed by providing the first speed to sixth speed gear trains G1 to G6 between a main shaft 52 that has a central axis C2 extending in the vehicle width direction and that is rotatably supported on the crankcase 19 so that the power from the crankshaft 27 of the internal combustion engine E can be input thereinto, and a countershaft 53 that is disposed so as to have a central axis C3 parallel to the main shaft 52 and that is operatively linked to the rear wheel WR, which is the driven wheel.

The main shaft 52 is disposed above and to the rear in the vehicle fore-and-aft direction of the crankshaft 27 when the crankcase 19 is viewed from the side, and is formed from a first shaft 54 and a second shaft 55 having the first shaft 54 coaxially and relatively rotatably inserted therethrough. The gear trains with odd-numbered gear positions, that is, the first speed gear train G1, the third speed gear train G3, and the fifth speed gear train G5 are provided between the first shaft 54 and the countershaft 53, and the gear trains with even-numbered gear positions, that is, the second speed gear train G2, the fourth speed gear train G4, and the sixth speed gear train G6 are provided between the second shaft 55 and the countershaft 53.

The first shaft 54 is formed so as to have a smaller diameter than that of the second shaft 55, one end part of the first shaft 54 extending rotatably through the upper case half body 32 of the crankcase 19 being rotatably supported on the upper case half body 32 via a ball bearing 56, and the other end part of the first shaft 54 being rotatably supported on the right case cover 49 via a clutch inner 75 of a first clutch 68 and a ball bearing 57. An intermediate part in the axial direction of the second shaft 55, which has a larger diameter than that of the first shaft 54, is rotatably supported on the upper case half body 32 of the crankcase 19 via a ball bearing 58, an intermediate part of the first shaft 54 is coaxially and relatively rotatably inserted through the second shaft 55, and a plurality of needle bearings 59 are disposed between the first shaft 54 and the second shaft 55.

The countershaft 53 is disposed at a position that is offset in the vertical direction with respect to the main shaft 52, and in this embodiment the countershaft 53 is disposed beneath and to the rear, in the vehicle fore-and-aft direction, of the main shaft 52 so that the central axis C3 is disposed on the dividing face 34 of the crankcase 19.

One end part of the countershaft 53 projects from a left side wall of the crankcase 19 with a ball bearing 61 and an annular seal member 62 disposed between itself and the crankcase 19, and the other end part of the countershaft 53 is rotatably supported on a right side wall of the crankcase 19 via a needle bearing 63.

A drive sprocket 64 is fixed to the one end part of the countershaft 53 outside the crankcase 19, and the rotational power output from the countershaft 53 is transmitted to the rear wheel WR via a chain (not illustrated) wound around the drive sprocket 64.

Housed in the clutch chamber 48 formed between the right side wall of the crankcase 19 and the right case cover 49 are a primary reduction gear 67 to which power from the crankshaft 27 is transmitted and first and second clutches 68 and 69 disposed between the primary reduction gear 67 and the main shaft 52.

A transmission tube shaft 70 that is adjacent to the second shaft 55 in the axial direction is relatively rotatably fitted onto an intermediate part, close to the other end, of the first shaft 54 while having a fixed axial position, and power from the crankshaft 27 is transmitted to the transmission tube shaft 70 via the primary reduction gear 67 and a damper spring 71. The primary reduction gear 67 is therefore formed from a drive gear 72 rotating together with the crankshaft 27, and a driven gear 73 disposed coaxially with the main shaft 52 so as to mesh with the drive gear 72, and the driven gear 73 is linked to the transmission tube shaft 70 via the damper spring 71.

The first clutch 68 is a hydraulic multi-plate clutch formed by relatively non-rotatably linking, in response to the action of oil pressure, a clutch outer 74 relatively non-rotatably joined to the transmission tube shaft 70 and the clutch inner 75 relatively non-rotatably joined to the first shaft 54 of the main shaft 52, and the second clutch 69 is a hydraulic multi-plate clutch formed by relatively non-rotatably linking, in response to the action of oil pressure, a clutch outer 76 relatively non-rotatably joined to the transmission tube shaft 70 and a clutch inner 77 relatively non-rotatably joined to the second shaft 55 of the main shaft 52.

That is, when the first clutch 68 attains a power transmission state rotational power from the crankshaft 27 is transmitted to the first shaft 54 via the primary reduction gear 67, the damper spring 71, the first clutch 68, and the transmission tube shaft 70, and when the second clutch 69 attains a power transmission state rotational power from the crankshaft 27 is transmitted to the second shaft 55 via the primary reduction gear 67, the damper spring 71, the second clutch 69, and the transmission tube shaft 70.

When the first clutch 68 is in a power transmission state and power is being transmitted from the crankshaft 27 to the first shaft 54 it is possible to transmit power from the first shaft 54 to the countershaft 53 via the gear train among the first, third, and fifth speed gear trains G1, G3, and G5 that has been alternatively established, and when the second clutch 69 is in a power transmission state and power is being transmitted from the crankshaft 27 from the second shaft 55 it is possible to transmit power from the second shaft 55 to the countershaft 53 via the gear train among the second, fourth, and sixth speed gear trains G2, G4, and G6 that has been alternatively established.

Figure 5:
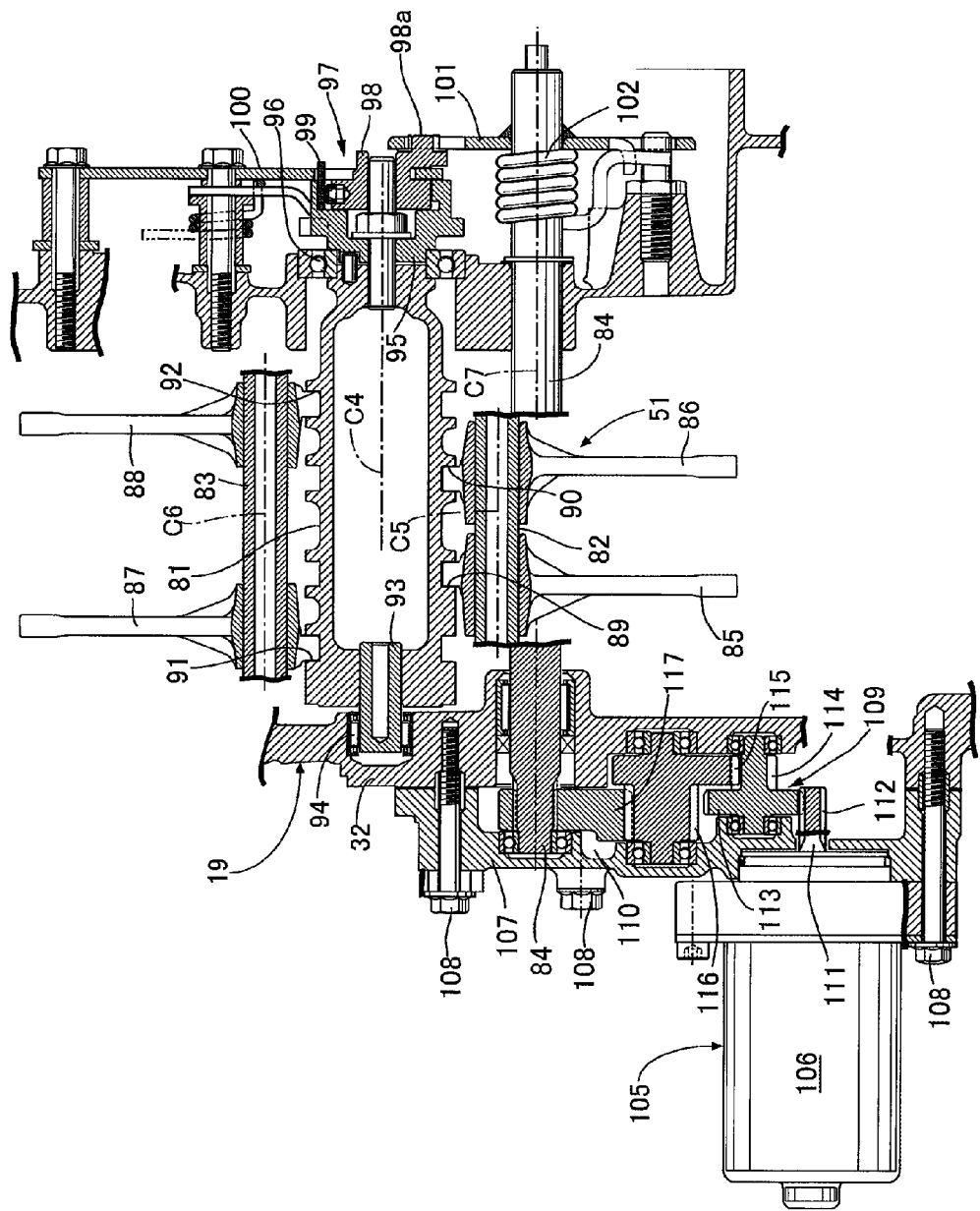
FIG. 5 is a sectional view along line 5-5 in FIG. 2. (first embodiment)

Referring in addition to FIG. 5, the gear selector mechanism 51 is formed so as to have a plurality of shaft members disposed in parallel to the main shaft 52 and the countershaft 53. In this embodiment, the gear selector mechanism 51 is formed so as to have a shift drum 81, first and second shift fork shafts 82 and 83, and a shift spindle 84 as the shaft members; a central axis C4 of the shift drum 81, central axes C5 and C6 of the first and second shift fork shafts 82 and 83, and a central axis C7 of the shift spindle 84 are parallel to the central axis C2 of the main shaft 52 and the central axis C3 of the countershaft 53 and, moreover, the shift drum 81, the first and second shift fork shafts 82 and 83, and the shift spindle 84 are disposed on the side opposite to the crankshaft 27 with respect to a virtual plane PL passing through the central axis C2 of the main shaft 52 and the central axis C3 of the countershaft 53, in this embodiment to the rear in the vehicle fore-and-aft direction.

First and second shift forks 85 and 86 are axially slidably supported on the first shift fork shaft 82, which is supported on the upper case half body 32 of the crankcase 19, and third and fourth shift forks 87 and 88 are axially slidably supported on the second shift fork shaft 83, which is supported on the upper case half body 32 of the crankcase 19.

Furthermore, the shift drum 81 is pivotably supported on the upper case half body 32 of the crankcase 19, and the first to fourth shift forks 85 to 88 respectively engage with four engagement grooves 89, 90, 91, and 92 provided in an outer face of the shift drum 81. These engagement grooves 89 to 92 are formed so as to determine the positions of the first to fourth shift forks 85 to 88 on the first and second shift fork shafts 82 and 83 depending on the position to which the shift drum 81 is pivoted, and due to the shift drum 81 pivoting, one of the first to sixth speed gear trains G1 to G6 is selectively established depending on the position to which it is pivoted.

A shaft 93 coaxially fixed to one end part of the shift drum 81 is rotatably supported on a left side wall of the upper case half body 32 of the crankcase 19 via a needle bearing 94. A shift drum center 95 is coaxially fixed to the other end part of the shift drum 81, and the shift drum center 95 and the other end part of the shift drum 81 are pivotably supported on a right side wall of the upper case half body 32 via a ball bearing 96.

The shift drum 81 is stepwise pivoted by the operation of shift position change drive means 97 coaxially linked to the other end part of the shift drum 81 so as to be operated by means of the input of a driving force; the shift position change drive means 97 is conventionally known and has a drum shifter 98 of which part is disposed within the shift drum center 95 so that it can pivot around the same axis as that of the shift drum 81, a plurality of pawls 99 that are fitted symmetrically to the drum shifter 98 so as to rise and fall in the radial direction of the drum shifter 98 and that are urged in the direction in which they rise and engage with a plurality of locations in the peripheral direction of the inner periphery of the drum shifter 98, and a fixed guide plate 100 that guides the rise and fall states of the pawl 99 in response to pivoting of the drum shifter 98.

The shift spindle 84 is pivotably supported on the upper case half body 32 of the crankcase 19, and an arm 101 fixed to an end part of the shift spindle 84 projecting from the right side wall of the upper case half body 32 is linked to a pin 98a projectingly provided at a position displaced from the pivot axis of the drum shifter 98 in the shift position change drive means 97. Furthermore, a lost motion spring 102 is provided between the shift spindle 84 and the upper case half body 32.

An automatic gear change control device 105 is disposed on one side face, in the vehicle width direction, of the upper case half body 32 in the crankcase 19, in this embodiment on the left side face of the upper case half body 32, the automatic gear change control device 105 being positioned to the rear in the vehicle fore-and-aft direction of the virtual plane PL when the crankcase 19 is viewed from the side, and this automatic gear change control device 105 is formed so as to include an electric motor 106, which is a shift actuator.

A cover member 107 covering, from the side, a rear upper part of the left side wall of the upper case half body 32 is mounted on the upper case half body 32 via a plurality of bolts 108, and the electric motor 106 is mounted on the cover member 107.

The automatic gear change control device 105 includes, in addition to the electric motor 106, a reduction mechanism 109 provided between the electric motor 106 and the shift spindle 84, and this reduction mechanism 109 is housed in a reduction chamber 110 formed between the cover member 107 and the upper case half body 32.

The reduction mechanism 109 is formed from a drive gear 112 provided on a motor shaft 111 of the electric motor 106, a first idle gear 113 meshing with the drive gear 112, a second idle gear 114 rotating together with the first idle gear 113, a third idle gear 115 meshing with the second idle gear 114, a fourth idle gear 116 rotating together with the third idle gear 115, and a driven gear 117 meshing with the fourth idle gear 116. The first and second idle gears 113 and 114 are formed as a unit and are rotatably supported by the cover member 107 and the upper case half body 32. The third and fourth idle gears 115 and 116 are formed as a unit and are rotatably supported by the cover member 107 and the upper case half body 32. Moreover, the third idle gear 115 and the driven gear 117 are sector gears.

The driven gear 117 of the reduction mechanism 109 is relatively non-pivotably linked to an end part, projecting from the left side wall of the upper case half body 32, of the shift spindle 84 pivotably supported by the upper case half body 32 of the crankcase 19.

In order to control the operation of the electric motor 106 of the automatic gear change control device 105 and connection-disconnection switching timing of the first and second clutches 68 and 69, a plurality of rotational speed sensors that individually detect the rotational speed of a plurality of rotating members forming part of the gear transmission mechanism 50 of the transmission M are mounted on the crankcase 19 so as to be disposed on the side opposite to the crankshaft 27 with respect to the virtual plane PL, in this embodiment to the rear in the vehicle fore-and-aft direction of the virtual plane PL. In this embodiment, a first rotational speed sensor S1 for detecting the vehicle speed, a second rotational speed sensor S2 for detecting the rotational speed of the second shaft 55 of the main shaft 52, and a third rotational speed sensor S3 for detecting the rotational speed of the first shaft 54 of the main shaft 52 are mounted on the crankcase 19 so as to be disposed to the rear, in the vehicle fore-and-aft direction, of the virtual plane PL.

The first rotational speed sensor S1 is disposed so as to detect the rotational speed of a fifth speed drive gear 118, which is a drive gear as a rotating member forming part of the gear transmission mechanism 50. The fifth speed drive gear 118 is relatively rotatably supported on the first shaft 54 of the main shaft 52 while always meshing with a fifth speed driven gear 119 relatively non-rotatably provided on the countershaft 53 so as to form, together with the fifth speed drive gear 118, the fifth speed gear train G5, and always rotates at a rotational speed corresponding to the vehicle speed when the two-wheeled motor vehicle is running.

Furthermore, the second rotational speed sensor S2 is disposed so as to detect the rotational speed of a fourth speed drive gear 120, which is another drive gear as a rotating member forming part of the gear transmission mechanism 50, and the fourth speed drive gear 120 is relatively non-rotatably provided on the second shaft 55 of the main shaft 52 and rotates together with the second shaft 55.

Furthermore, the third rotational speed sensor S3 is disposed so as to detect the rotational speed of the first speed driven gear 121, which is a rotating member forming part of the transmission M; the first speed driven gear 121 is relatively rotatably provided on the countershaft 53 while always meshing with a first speed drive gear 122 provided integrally with the first shaft 54 of the main shaft 52 so as to form, together with the first speed driven gear 121, the first speed gear train G1, and rotates synchronously with the first shaft 54.

The first, second, and third rotational speed sensors S1, S2, and S3 are disposed in a divided manner so as to sandwich the shift drum 81, the first shift fork shaft 82, the second shift fork shaft 83, and the shift spindle 84 of the gear selector mechanism 51 in a projection on a plane orthogonal to the central axis of the crankshaft 27. In this embodiment the first and second rotational speed sensors S1 and S2, which are some of the first to third rotational speed sensors S1 to S3, are mounted on the upper case half body 32 of the crankcase 19 in front, in the vehicle fore-and-aft direction, of the shift drum 81, the first shift fork shaft 82, the second shift fork shaft 83, and the shift spindle 84, and the third rotational speed sensor S3, which is the remainder of the first to third rotational speed sensors S1, S2, and S3, is mounted on the upper case half body 32 of the crankcase 19 to the rear, in the vehicle fore-and-aft direction, of the shift drum 81, the first shift fork shaft 82, the second shift fork shaft 83, and the shift spindle 84.

Moreover, at least one of the first to third rotational speed sensors S1 to S3, in this embodiment the first and second rotational speed sensors S1 and S2, are mounted on the upper face of the crankcase 19, that is, the upper face 32a of the upper case half body 32, and the third rotational speed sensor S3, which corresponds to at least one of the remaining rotational speed sensors, is mounted on the rear face of the crankcase 19 along the vehicle fore-and-aft direction, that is, on a rear face 32b of the upper case half body 32.

At least one of the first to third rotational speed sensors S1 to S3 is mounted on the crankcase 19 so as to oppose the outer periphery of a drive gear provided on the main shaft 52, and in this embodiment the first rotational speed sensor S1 is mounted on the upper face 32a of the upper case half body 32 by means of a pair of bolts 123 and 123 so as to oppose the outer periphery of the fifth speed drive gear 118, and the second rotational speed sensor S2 is mounted on the upper face 32a of the upper case half body 32 by means of a bolt 124 so as to oppose the outer periphery of the fourth speed drive gear 120. Furthermore, at least one of the remaining rotational speed sensors is mounted on the crankcase 19 so as to oppose the outer periphery of a driven gear provided on the countershaft 53, and in this embodiment the third rotational speed sensor S3 is mounted on the rear face 32b of the upper case half body 32 by means of a pair of bolts 125 and 125 so as to oppose the outer periphery of the first speed driven gear 121.

Projectingly provided on a rear end part of the crankcase 19 as clearly shown in FIG. 2 so as to project rearward along the vehicle fore-and-aft direction is a projection 127 for forming a through hole 126 for the support shaft 22, which is the support member for supporting the crankcase 19 on the center frame 16 of the vehicle body frame F, to be inserted through. The third rotational speed sensor S3, which is mounted on the rear face 32b of the crankcase 19, is covered from below by the projection 127.

Furthermore, central axes C8 and C9 of the first and second rotational speed sensors S1 and S2, which are some of the first to third rotational speed sensors S1 to S3, and a central axis C10 of the third rotational speed sensor S3 that sandwiches, between itself and the first and second rotational speed sensors S1 and S2, the shift drum 81, the first shift fork shaft 82, the second shift fork shaft 83, and the shift spindle 84 of the gear selector mechanism 51 intersect each other at an acute angle in a projection on a plane orthogonal to the central axis C1 of the crankshaft 27. In this embodiment, since the first and second rotational speed sensors S1 and S2 are at the same position in the vehicle fore-and-aft direction, an angle α formed by the central axes C8 and C9 of the first and second rotational speed sensor S1 and the central axis C10 of the third rotational speed sensor S3 on the projection is an acute angle.

Moreover, the shift drum 81, the first shift fork shaft 82, the second shift fork shaft 83, and the shift spindle 84 are disposed, in the projection, in a range surrounded by the central axes C8 and C9 of the first and second rotational speed sensors S1 and S2 and the central axis C10 of the third rotational speed sensor S3.

Furthermore, a neutral sensor S4 opposing the outer periphery of the shift drum 81 is mounted at a position, adjacent to the third rotational speed sensor S3, on the rear face 32b of the upper case half body 32, so as to detect a neutral position of the shift drum 81.

Figure 6:
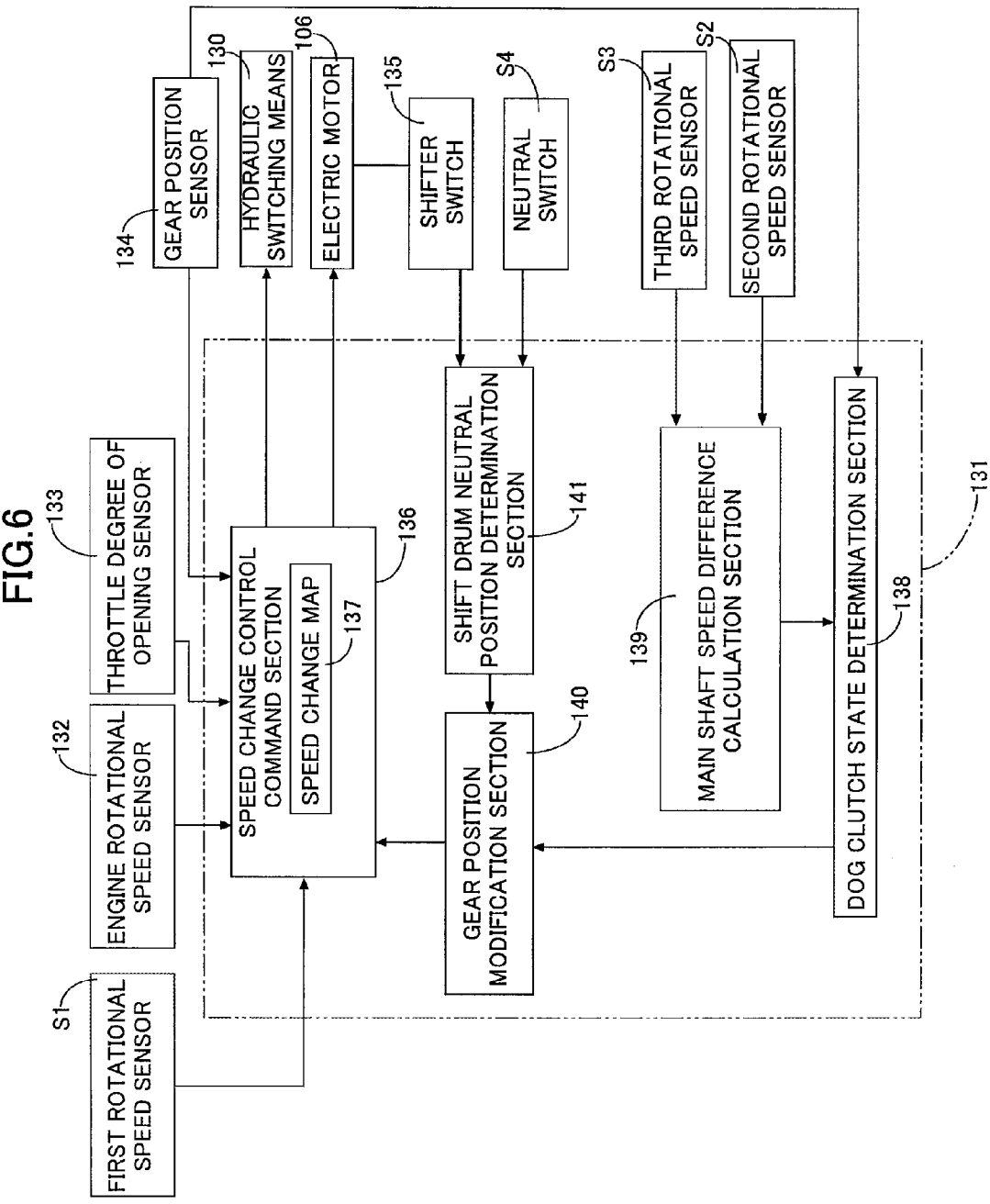
FIG. 6 is a diagram showing the arrangement of a speed change control system. (first embodiment)

In FIG. 6, the operation of hydraulic switching means 130 for switching the connection/disconnection of the first and second clutches 68 and 69 and the operation of the electric motor 106 of the automatic gear change control device 105 are controlled by a control unit 131. Input into this control unit 131 are detection signals from the first to third rotational speed sensors S1 to S3, the neutral sensor S4, an engine rotational speed sensor 132, a throttle degree of opening sensor 133, a gear position sensor 134 that detects a gear position based on the position to which the shift drum 81 is pivoted, and a shifter switch 135 that detects the position to which the shift spindle 84 is pivoted.

The control unit 131 includes a speed change control command section 136 in which a speed change map 137 is stored, a dog clutch state determination section 138, a main shaft speed difference calculation section 139, a gear position modification section 140, and a shift drum neutral position determination section 141.

The speed change control command section 136 outputs a signal for controlling the operation of the hydraulic switching means 130 and the electric motor 106 in accordance with the speed change map based on the vehicle speed input from the first rotational speed sensor S1, the engine rotational speed input from the engine rotational speed sensor 132, the throttle degree of opening input from the throttle degree of opening sensor 133, and the gear position input from the gear position sensor 134.

The main shaft speed difference calculation section 139 calculates the difference in rotational speed between the first and second shafts 54 and 55 of the main shaft 52 based on the values detected by the second and third rotational speed sensors S2 and S3. The dog clutch state determination section 138 determines whether or not the dog clutch that can alternatively switch the first to sixth speed gear trains G1 to G6 of the gear transmission mechanism 50 is in a properly meshed state or an unmeshed state based on information from the main shaft speed difference calculation section 139 and the gear position sensor 134. The gear position modification section 140 has a modifying function so that the dog clutch attains a properly meshed state or an unmeshed state by operating the hydraulic switching means 130 and the electric motor 106 by means of the speed change control command section 136 when the dog clutch state determination section 138 determines that there is neither a properly meshed state nor an unmeshed state. Furthermore, the shift drum neutral position determination section 141 determines whether or not the transmission M is in a reliably neutral state based on information from the shifter switch 135 and the neutral switch S4.

The operation of this embodiment is now explained; the first to third rotational speed sensors S1, S2, and S3, which individually detect the rotational speed of the fifth speed drive gear 118, the fourth speed drive gear 120, and the first speed driven gear 121 forming part of the gear transmission mechanism 50 having the first to sixth speed gear trains G1 to G6, which can be alternatively established, provided between the main shaft 52 and the countershaft 53, are mounted on the crankcase 19 so as to be disposed on the side opposite to the crankshaft 27 with respect to the virtual plane PL passing through the central axes C2 and C3 of the main shaft 52 and the countershaft 53, and in this embodiment to the rear, in the vehicle fore-and-aft direction, of the virtual plane PL. Since the first and second rotational speed sensors S1 and S2, which are some of the first to third rotational speed sensors S1 to S3, are mounted on the crankcase 19 in front, in the vehicle fore-and-aft direction, of the central axes C4 to C7 of the shift drum 81, the first shift fork shaft 82, the second shift fork shaft 83, and the shift spindle 84 of the gear selector mechanism 51 and are also disposed in a divided manner so as to sandwich the shift drum 81, the first shift fork shaft 82, the second shift fork shaft 83, and the shift spindle 84, which are a plurality of the shaft members of the gear selector mechanism 51, in the projection on the plane orthogonal to the central axis C1 of the crankshaft 27, it is possible to dispose the gear selector mechanism 51 and the first to third rotational speed sensors S1 to S3 in a concentrated manner while easily avoiding interference between the first to third rotational speed sensors S1 to S3, thus avoiding any increase in the size of the power unit P and enhancing the degree of freedom of the layout of the transmission M within the crankcase 19.

Furthermore, since the central axis C2 of the main shaft 52 extending in the vehicle width direction is disposed above and in front, in the vehicle fore-and-aft direction, of the central axis C3 of the countershaft 53 when the crankcase 19 is viewed from the side, the first and second rotational speed sensors S1 and S2, which correspond to at least one of the first to third rotational speed sensors S1 to S3, are mounted on the upper face 32a of the crankcase 19, and the third rotational speed sensor S3, which corresponds to at least one of the remaining rotational speed sensors, is mounted on the rear face 32b of the crankcase 19 along the vehicle fore-and-aft direction, it is possible to dispose the gear selector mechanism 51 and at least some, that is, S1 and S2 of the rotational speed sensors S1 to S3 in a concentrated manner on the rear upper part of the crankcase 19, thus enabling the power unit P to be made compact.

Moreover, since the first and second rotational speed sensors S1 and S2, which correspond to at least one of the first to third rotational speed sensors S1 to S3, are mounted on the crankcase 19 so as to oppose the outer peripheries of the fifth speed drive gear 118 and the fourth speed drive gear 120 provided on the main shaft 52, and the third rotational speed sensor S3, which corresponds to at least one of the remaining rotational speed sensors, is mounted on the crankcase 19 so as to oppose the outer periphery of the first speed driven gear 121 provided on the countershaft 53, it becomes easy to avoid interference between the first and second rotational speed sensors S1 and S2 and the third rotational speed sensor S3 by disposing the first and second rotational speed sensors S1 and S2 and the third rotational speed sensor S3 so that they are spaced from each other, and it is possible to ensure that there is space for disposing components of the transmission M between the first and second rotational speed sensors S1 and S2 and the third rotational speed sensor S3, thus enabling the power unit P to be made smaller.

Furthermore, since the crankcase 19 is divided into two and formed from the upper case half body 32 and the lower case half body 33 one above the other, and the first to third rotational speed sensors S1 to S3 and the shift drum 81, the first shift fork shaft 82, the second shift fork shaft 83, and the shift spindle 84 of the gear selector mechanism 51 are supported on the upper case half body 32, it is possible to make the power unit P more compact by disposing the first to third rotational speed sensors S1 to S3 and the gear selector mechanism 51 in a concentrated manner on the upper case half body 32.

Moreover, since the projection 127, in which the through hole 126 for the support shaft 22 supporting the crankcase 19 on the center frame 16 of the vehicle body frame F to be inserted through is formed, is projectingly provided on the rear end part of the crankcase 19 so as to face rearward along the vehicle fore-and-aft direction, and the third rotational speed sensor S3 mounted on the rear face 32b of the crankcase 19 is covered from below by the projection 127, it is possible to protect the third rotational speed sensor S3 from flying stones, grit, etc. scattered by the front wheel WF or the rear wheel WR.

Furthermore, since the first to third rotational speed sensors S1 to S3 are disposed so that the central axes C8 and C9 of the first and second rotational speed sensors S1 and S2, which correspond to some of the rotational speed sensors S1 to S3, and the central axis C10 of the third rotational speed sensor S3 that sandwiches, between itself and the first and second rotational speed sensors S1 and S2, the shift drum 81, the first shift fork shaft 82, the second shift fork shaft 83, and the shift spindle 84 of the gear selector mechanism 51 intersect each other at an acute angle in the projection on the plane orthogonal to the central axis C1 of the crankshaft 27, it is possible to dispose the shift drum 81, the first shift fork shaft 82, the second shift fork shaft 83, and the shift spindle 84 of the gear selector mechanism 51 and the first to third rotation sensors S1 to S3 together in a compact manner, thus contributing to making the power unit P compact and concentrating the mass.

Moreover, since the shift drum 81, the first and second shift fork shafts 82 and 83, and the shift spindle 84 of the gear selector mechanism 51 are disposed in a range surrounded by the central axes C8 and C9 of the first and second rotational speed sensors S1 and S2, and the central axis C10 of the third rotational speed sensor S3 in the projection on the plane orthogonal to the central axis C1 of the crankshaft 27, it is possible to dispose the shift drum 81, the first and second shift fork shafts 82 and 83, the shift spindle 84 together in a more compact manner, thus further contributing to making the power unit P compact and concentrating the mass.

Furthermore, since the central axis C1 of the crankshaft 27 is disposed so as to extend in the vehicle width direction, and the automatic gear change control device 105, which includes the electric motor 106, is disposed on one side face (on the left side face in this embodiment), in the vehicle width direction, of the crankcase 19 to the rear of the virtual plane PL in the vehicle fore-and-aft direction when the crankcase 19 is viewed from the side, so as to drive the gear selector mechanism 51, it is possible to also dispose the automatic gear change control device 105 in a concentrated manner in the rear part of the crankcase 19 when the power unit P is viewed from the side, thus making the power unit P compact.

Moreover, since the main shaft 52 includes the first shaft 54 having the first clutch 68 disposed between itself and the crankshaft 27, and the second shaft 55 coaxially and relatively rotatably surrounding the first shaft 54 so as to have the second clutch 69 disposed between itself and the crankshaft 27, among the first to third rotational speed sensors S1 to S3 the first rotational speed sensor S1 is disposed so as to oppose the outer periphery of the fifth speed drive gear 118 supported on the first shaft 54 so as to rotate at a rotational speed corresponding to the vehicle speed, the second rotational speed sensor S2 is disposed so as to oppose the outer periphery of the fourth speed drive gear 120 provided on the second shaft 55 so as to rotate together with the second shaft 55, and the third rotational speed sensor S3 is disposed so as to oppose the outer periphery of the first speed driven gear 121 relatively rotatably supported on the countershaft 53 so as to rotate synchronously with the first shaft 54, with regard to the power unit P in which the first to third rotational speed sensors S1 to S3 are individually opposed to the gears 118, 120, and 121, which have different rotational speeds depending on the running conditions, it is possible, by disposing the three rotational speed sensors S1 to S3 closer to the side opposite to the crankshaft 27 with respect to the virtual plane PL passing through the central axes C2 and C3 of the main shaft 52 and the countershaft 53, to make the power unit P compact even when there are the three rotational speed sensors S1 to S3.

An embodiment of the present invention is explained above, but the present invention is not limited to the above embodiment and may be modified in a variety of ways as long as the modifications do not depart from the spirit and scope thereof.

The invention claimed is:

1. A vehicle power unit in which a transmission comprising a gear transmission mechanism and a gear selector mechanism is housed in a transmission case mounted on a vehicle body frame, the gear transmission mechanism comprising gear trains with a plurality of gear positions that can be established alternatively provided between a main shaft into which power from a crankshaft of an internal combustion engine can be input and a countershaft disposed in parallel to the main shaft at a position offset in a vertical direction with respect to the main shaft and operatively linked to a driven wheel, the gear selector mechanism being arranged so as to have a plurality of shaft members disposed in parallel to the main shaft and the countershaft and being disposed on a side opposite to the crankshaft with respect to a virtual plane passing through a central axis of the main shaft and a central axis of the countershaft while being capable of operating so as to alternatively establish the gear trains with the plurality of gear positions, and a plurality of rotational speed sensors individually detecting a rotational speed of a plurality of rotating members forming part of the gear transmission mechanism are mounted on the transmission case on the side opposite to the crankshaft with respect to the virtual plane,
wherein the plurality of rotational speed sensors are disposed in a distributed manner so as to sandwich the plurality of shaft members of the gear selector mechanism between the plurality of rotational speed sensors in a projection on a plane orthogonal to a central axis of the crankshaft,
wherein the central axis of the main shaft is disposed further upward and forward in a vehicle fore-and-aft direction than the central axis of the countershaft so as to extend in a vehicle width direction, at least one of the plurality of rotational speed sensors is mounted on an upper face of the transmission case, and at least one of the remaining rotational speed sensors is mounted on a rear face, along the vehicle fore-and-aft direction, of the transmission case, and
wherein a projection is projectingly provided on a rear end part of the transmission case so as to face rearward along the vehicle fore-and-aft direction, the projection forming a through hole, a support member for supporting the transmission case on the vehicle body frame being inserted through the through hole, and a rotational speed sensor mounted on the rear face of the transmission case is covered from below by the projection.

2. The vehicle power unit according to claim 1, wherein at least one of the plurality of rotational speed sensors is mounted on the transmission case so as to oppose an outer periphery of a drive gear provided on the main shaft, and at least one of the remaining rotational speed sensors is mounted on the transmission case so as to oppose an outer periphery of a driven gear provided on the countershaft.

3. The vehicle power unit according to claim 2, wherein the transmission case is divided into two and formed from an upper case half body and a lower case half body one above the other, the plurality of rotational speed sensors and the plurality of shaft members of the gear selector mechanism being supported on the upper case half body.

4. The vehicle power unit according to claim 2, wherein the central axis of the crankshaft is disposed so as to extend in the vehicle width direction, and an automatic gear change control device that includes a shift actuator is disposed on a face, on one side in the vehicle width direction, of the transmission case to a rear of the virtual plane in the vehicle fore-and-aft direction as seen in a side view of the transmission case, so as to drive the gear selector mechanism.

5. The vehicle power unit according to claim 1,
wherein the plurality of rotational speed sensors are disposed so that, among the rotational speed sensors, a central axis of some of the rotational speed sensors and a central axis of the other rotational speed sensor intersect at an acute angle in a projection on a plane orthogonal to the central axis of the crankshaft, the other rotational speed sensor sandwiching a plurality of shaft members of the gear selector mechanism between the other rotational speed sensor and said some of the rotational speed sensors.

6. The vehicle power unit according to claim 5, wherein the gear selector mechanism comprises a shift drum, a shift fork shaft, and a shift spindle, which correspond to the shaft member, and the shift drum, the shift fork shaft, and the shift spindle are disposed in a range surrounded by the central axis of said some of the rotational speed sensors and the central axis of the other rotational speed sensor in a projection on a plane orthogonal to the central axis of the crankshaft.

7. The vehicle power unit according to claim 6, wherein the central axis of the crankshaft is disposed so as to extend in the vehicle width direction, and an automatic gear change control device that includes a shift actuator is disposed on a face, on one side in the vehicle width direction, of the transmission case to a rear of the virtual plane in the vehicle fore-and-aft direction as seen in a side view of the transmission case, so as to drive the gear selector mechanism.

8. A vehicle power unit in which a transmission comprising a gear transmission mechanism and a gear selector mechanism is housed in a transmission case mounted on a vehicle body frame, the gear transmission mechanism comprising gear trains with a plurality of gear positions that can be established alternatively provided between a main shaft into which power from a crankshaft of an internal combustion engine can be input and a countershaft disposed in parallel to the main shaft at a position offset in a vertical direction with respect to the main shaft and operatively linked to a driven wheel, the gear selector mechanism being arranged so as to have a plurality of shaft members disposed in parallel to the main shaft and the countershaft and being disposed on a side opposite to the crankshaft with respect to a virtual plane passing through a central axis of the main shaft and a central axis of the countershaft while being capable of operating so as to alternatively establish the gear trains with the plurality of gear positions, and a plurality of rotational speed sensors individually detecting a rotational speed of a plurality of rotating members forming part of the gear transmission mechanism are mounted on the transmission case on the side opposite to the crankshaft with respect to the virtual plane, wherein the plurality of rotational speed sensors are disposed in a distributed manner so as to sandwich the plurality of shaft members of the gear selector mechanism between the plurality of rotational speed sensors in a projection on a plane orthogonal to a central axis of the crankshaft, and wherein the main shaft comprises a first shaft having a first clutch disposed between the first shaft and the crankshaft, and a second shaft coaxially and relatively rotatably surrounding the first shaft so as to have a second clutch disposed between the second shaft and the crankshaft, among first to third rotational speed sensors of the plurality of rotational speed sensors the first rotational speed sensor is disposed so as to oppose an outer periphery of a drive gear, which is the rotating member supported on the first shaft so as to rotate at a rotational speed corresponding to a vehicle speed, the second rotational speed sensor is disposed so as to oppose an outer periphery of another drive gear, which is the rotating member provided on the second shaft so as to rotate together with the second shaft, and the third rotational speed sensor is disposed so as to oppose an outer periphery of a driven gear, which is the rotating member relatively rotatably supported on the countershaft so as to rotate synchronously with the first shaft.

* * * * *